US009258781B2

(12) United States Patent
Matin et al.

(10) Patent No.: US 9,258,781 B2
(45) Date of Patent: Feb. 9, 2016

(54) METHOD AND APPARATUS FOR EARLY TERMINATION OF AN RX CHAIN

(71) Applicant: QUALCOMM Incorporated, San Diego, CA (US)

(72) Inventors: Sharif Ahsanul Matin, San Diego, CA (US); Nate Chizgi, Sunnyvale, CA (US); Atul Arvind Salvekar, Emeryville, CA (US); Jun Xing, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 13/974,952

(22) Filed: Aug. 23, 2013

(65) Prior Publication Data

US 2014/0153462 A1   Jun. 5, 2014

Related U.S. Application Data

(60) Provisional application No. 61/732,811, filed on Dec. 3, 2012.

(51) Int. Cl.
*H04W 52/02* (2009.01)
*H04W 52/14* (2009.01)
*H04W 52/22* (2009.01)
*H04W 52/44* (2009.01)
*H04W 52/58* (2009.01)

(52) U.S. Cl.
CPC ........ *H04W 52/0238* (2013.01); *H04W 52/221* (2013.01); *H04W 52/44* (2013.01); *H04W 52/02* (2013.01); *H04W 52/146* (2013.01); *H04W 52/58* (2013.01); *Y02B 60/1225* (2013.01); *Y02B 60/142* (2013.01); *Y02B 60/144* (2013.01)

(58) Field of Classification Search
CPC .......... H04W 52/0238; H04W 52/146; H04W 52/221; H04W 52/44; H04W 52/58; Y02B 60/1225; Y02B 60/142; Y02B 60/144
See application file for complete search history.

(56) References Cited

U.S. PATENT DOCUMENTS

| | | | |
|---|---|---|---|
| 6,934,268 B1 * | 8/2005 | Hedlund et al. | 370/311 |
| 7,006,482 B1 * | 2/2006 | Choi et al. | 370/342 |
| 7,146,142 B1 * | 12/2006 | Raaf | 455/245.1 |
| 7,649,859 B2 * | 1/2010 | Usuda et al. | 370/318 |
| 7,768,991 B2 * | 8/2010 | Kim | H04B 7/2643 370/310 |
| 8,953,537 B2 * | 2/2015 | Hariharan et al. | 370/329 |
| 9,077,385 B2 * | 7/2015 | Kim | H03M 13/3738 |
| 2005/0022101 A1 | 1/2005 | Malm et al. | |
| 2005/0122933 A1 * | 6/2005 | Kwon et al. | 370/328 |
| 2006/0246937 A1 * | 11/2006 | Lindoff | 455/522 |

(Continued)

OTHER PUBLICATIONS

International Search Report and Written Opinion—PCT/US2013/071095—ISA/EPO—Feb. 5, 2014. 10 total pages.

*Primary Examiner* — Parth Patel
*Assistant Examiner* — Kai Chang
(74) *Attorney, Agent, or Firm* — Arent Fox LLP

(57) ABSTRACT

Methods and apparatus for wireless communication for improving the call performance and power consumption during the connection state of a user equipment (UE). Aspects of the methods and apparatus relate to receiving a transmit power control (TPC) command from a network entity and decoding every TPC slot of the TPC command. Aspects of the methods and apparatus include ceasing the decoding of a TPC slot set when the current decoded symbol of the TPC slot is in disagreement with the previous decoded symbol of the TPC slot. The receiver of the UE is then deactivated until the end of the TPC slot set.

20 Claims, 10 Drawing Sheets

(56) References Cited

U.S. PATENT DOCUMENTS

| | | | |
|---|---|---|---|
| 2007/0021139 A1* | 1/2007 | Baker et al. | 455/522 |
| 2007/0191048 A1* | 8/2007 | Catreux-Erceg et al. | 455/522 |
| 2008/0076462 A1* | 3/2008 | Iochi | H04W 52/26 455/522 |
| 2008/0159238 A1* | 7/2008 | Niwano | H04W 52/286 370/336 |
| 2009/0207815 A1* | 8/2009 | Parkvall | H04B 7/2656 370/336 |
| 2009/0209279 A1* | 8/2009 | Kuroda et al. | 455/522 |
| 2009/0239590 A1* | 9/2009 | Parkvall | 455/572 |
| 2009/0304024 A1 | 12/2009 | Jou et al. | |
| 2010/0142479 A1 | 6/2010 | Black et al. | |
| 2010/0238892 A1* | 9/2010 | Dahlman et al. | 370/329 |
| 2010/0254324 A1* | 10/2010 | Van Lieshout | H04W 52/286 370/329 |
| 2010/0260117 A1* | 10/2010 | Ojala et al. | 370/329 |
| 2011/0064036 A1 | 3/2011 | Tsai et al. | |
| 2011/0070919 A1* | 3/2011 | Komine et al. | 455/522 |
| 2012/0064938 A1* | 3/2012 | Goto et al. | 455/522 |
| 2012/0113825 A1* | 5/2012 | Baglin et al. | 370/252 |
| 2012/0163259 A1* | 6/2012 | Yang et al. | 370/311 |
| 2012/0243515 A1 | 9/2012 | Xue et al. | |
| 2013/0034070 A1* | 2/2013 | Seo et al. | 370/329 |
| 2013/0107780 A1* | 5/2013 | Choi et al. | 370/311 |
| 2013/0142094 A1 | 6/2013 | Homchaudhuri et al. | |
| 2014/0098726 A1* | 4/2014 | Kang et al. | 370/311 |
| 2014/0321406 A1* | 10/2014 | Marinier et al. | 370/329 |

* cited by examiner

METHOD AND APPARATUS FOR EARLY TERMINATION OF AN RX CHAIN

CLAIM OF PRIORITY UNDER 35 U.S.C. §119

The present Application for Patent claims priority to U.S. Provisional Application No. 61/732,811 entitled "METHOD AND APPARATUS FOR EARLY TERMINATION OF AN RX CHAIN" filed Dec. 3, 2012 and assigned to the assignee hereof and hereby expressly incorporated by reference.

BACKGROUND

1. Field

Aspects of the present disclosure relate generally to wireless communication systems, and more particularly, to an apparatus and method for improving the call performance and power consumption during the connection state of a user equipment (UE), thereby providing consistent service in a wireless communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In most wireless communication systems, a critical advantage is procured when a connection state of a UE to a network entity allows for enhanced talk time and low power consumption. An algorithm called a Frame Early Termination (FET) algorithm is utilized when certain conditions are met where the UE turns off its receiver even before the end of the transmission time interval (TTI) of a call. As such, saving current consumption by the UE to enhance "talk time" metrics can be achieved by utilizing aspects of a FET algorithm.

Thus, aspects of this apparatus and method include improving FET performance for calls thereby improving the call performance and power consumption of a UE during the connection state with a network entity.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods and apparatus for wireless communication for improving the call performance and power consumption during the connection state of a UE is provided. Aspects of the methods and apparatus relate to receiving a transmit power control (TPC) command from a network entity and decoding every TPC slot of the TPC command. Aspects of the methods and apparatus include ceasing the decoding of a TPC slot set when the current decoded symbol of the TPC slot is in disagreement with the previous decoded symbol of the TPC slot. The receiver of the UE is then deactivated until the end of the TPC slot set.

A method for improving the call performance and power consumption is provided. The method includes receiving a TPC command from a network entity, wherein the TPC command is divided into TPC slots and decoding every TPC slot of the TPC command resulting in a decoded symbol for every TPC slot of the TPC command. Additionally, the method includes determining when a current decoded symbol of the TPC slot is in disagreement with a previous decoded symbol in the TPC slot and ceasing the decoding of a TPC slot set when the current decoded symbol of the TPC slot is in disagreement with the previous decoded symbol of the TPC slot. Furthermore, the method includes deactivating a receiver of the UE until the end of the TPC slot set.

In another aspect, an apparatus for improving the call performance and power consumption is provided. The apparatus includes a processor configured to receive a TPC command from a network entity, wherein the TPC command is divided into TPC slots and decode every TPC slot of the TPC command resulting in a decoded symbol for every TPC slot of the TPC command. Additionally, the processor is configured to determine when a current decoded symbol of the TPC slot is in disagreement with a previous decoded symbol in the TPC slot set and cease the decoding of a TPC slot set when the current decoded symbol of the TPC slot is in disagreement with the previous decoded symbol of the TPC slot. Furthermore, the processor is configured to deactivate a receiver of the UE until the end of the TPC slot set.

In another aspect, an apparatus for improving the call performance and power consumption is provided that includes means for receiving a TPC command from a network entity, wherein the TPC command is divided into TPC slots and means for decoding every TPC slot of the TPC command resulting in a decoded symbol for every TPC slot of the TPC command. Additionally, the apparatus includes means for determining when a current decoded symbol of the TPC slot is in disagreement with a previous decoded symbol in the TPC slot and means for ceasing the decoding of a TPC slot set when the current decoded symbol of the TPC slot is in disagreement with the previous decoded symbol of the TPC slot. Furthermore, the apparatus includes means for deactivating a receiver of the UE until the end of the TPC slot set.

In yet another aspect, a computer-readable media for improving the call performance and power consumption is provided that includes machine-executable code for receiving a TPC command from a network entity, wherein the TPC command is divided into TPC slots and decoding every TPC slot of the TPC command resulting in a decoded symbol for every TPC slot of the TPC command. Additionally, the code may be executable for determining when a current decoded symbol of the TPC slot is in disagreement with a previous decoded symbol in the TPC slot and ceasing the decoding of a TPC slot set when the current decoded symbol of the TPC slot is in disagreement with the previous decoded symbol of the TPC slot. Furthermore, the code may be executable for deactivating a receiver of the UE until the end of the TPC slot set.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As stated above, there are two types of uplink Power Control Algorithms (PCA) (i.e. UP/DOWN commands signaled by NodeBs during downlink to control transmission power of a UE during uplink) allowed in 3GPP specification, PCA1, and PCA2. The purpose of PCA2 is mainly to stabilize uplink interferences by reducing variances of individual transmissions power of different UEs. PCA2 effectively turns off uplink power control by transmitting an alternating series of TPC commands.

Another algorithm, called a FET algorithm, is utilized when certain conditions are met where the UE turns off its receiver even before the end of the TTI of a call. Generally, a TPC command may be divided into three sets of five TPC sub-commands within a radio frame. In order for the FET algorithm to decide on an UP command, all consecutive received five TPC commands (from five consecutive slots) must be UP; and in order to decide an ultimate DOWN command, all consecutive five TPC commands (from five consecutive slots) must be DOWN. As such, there can be only three ultimate UP or DOWN commands per radio frame (15 slots, or 10 mS.). However, when there is a disagreement within the set of five TPC commands, the UE doesn't change the transmission power until after end of five slot group.

By exploiting and manipulating the FET algorithm along with the proposed algorithm for a call with PCA2, improvements in the call performance and power consumption of a UE during the connection state with a network entity may be achieved.

Figure 1:
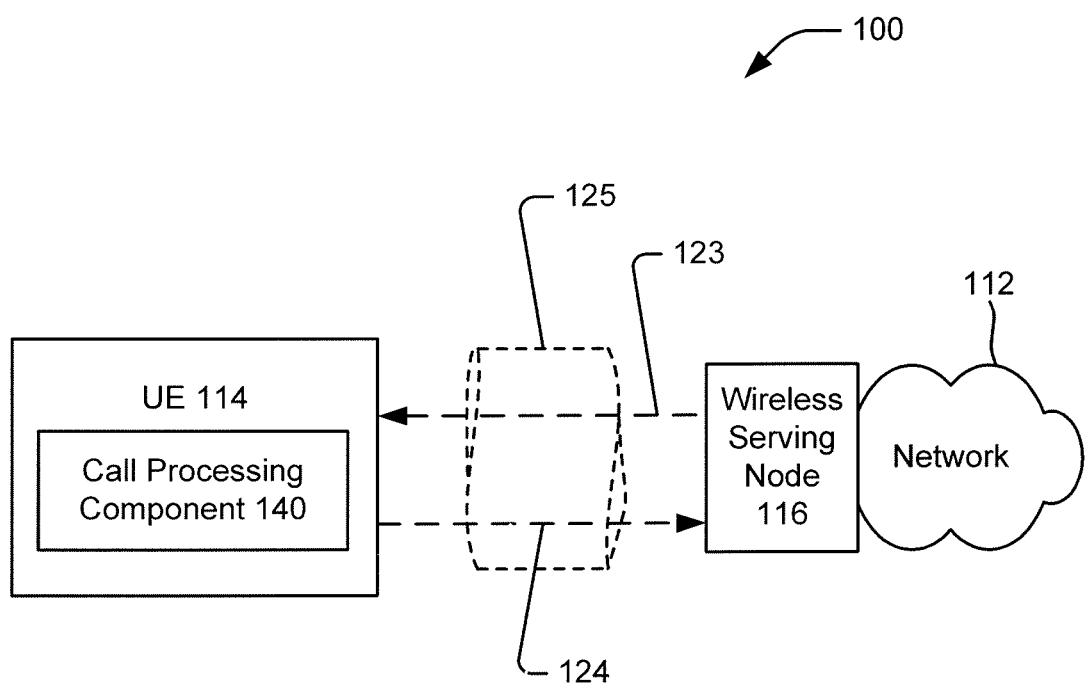
FIG. 1 is a schematic diagram illustrating an example aspect of call processing in a wireless communication system.

Referring to FIG. 1, in one aspect, a wireless communication system 100 is configured to facilitate transmitting vast amount of data from a mobile device to a network. Wireless communication system 100 includes at least one UE 114 that may communicate wirelessly with one or more network 112 via serving nodes, including, but not limited to, wireless serving node 116 over one or more wireless link 125. The one or more wireless link 125, may include, but are not limited to, signaling radio bearers and/or data radio bearers. Wireless serving node 116 may be configured to transmit one or more signals 123 to UE 114 over the one or more wireless link 125, and/or UE 114 may transmit one or more signals 124 to wireless serving node 116. In an aspect, signal 123 and signal 124 may include, but are not limited to, one or more messages, such as transmitting a data from the UE 114 to the network via wireless serving node 116.

UE 114 may comprise a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 116 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other small base station.

Figure 2:
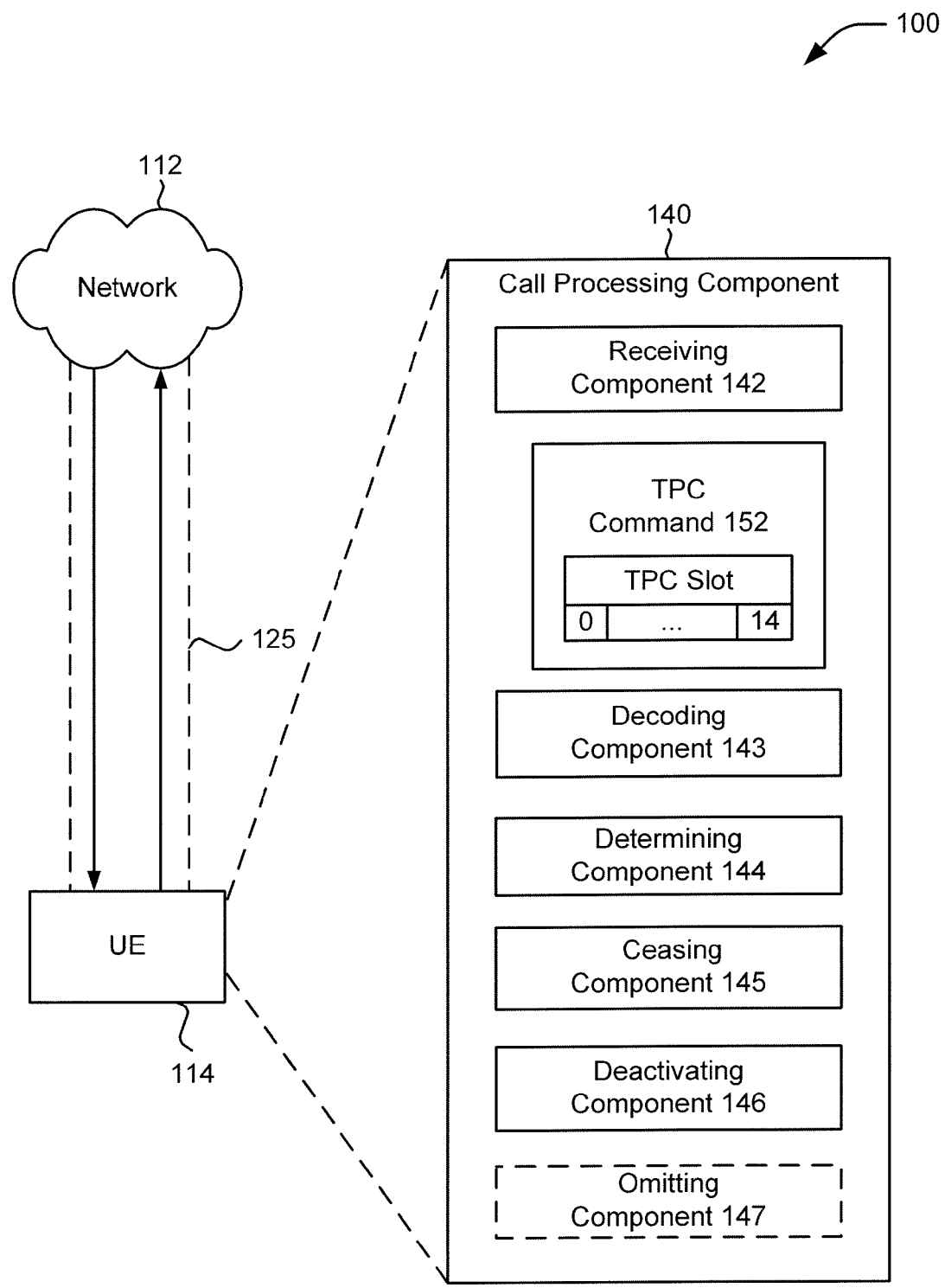
FIG. 2 is a schematic diagram illustrating another exemplary aspect of call processing in a wireless communication system.

Referring to FIG. 2, in an aspect of the present apparatus and method, a wireless communication system 100 is configured to include wireless communications between network 112 and UE 114. The wireless communications system may be configured to support communications between a number of users. FIG. 2 illustrates a manner in which network 112 communicates with UE 114 over wireless link 125. The wireless communication system 100 can be configured for downlink message transmission or uplink message transmission, as represented by the up/down arrows between network 112 and UE 114.

In an aspect, within the UE 114 resides a call processing component 140. The call processing component 140 may be configured, among other things, to include a receiving component 142 capable of receiving a TPC command from a network entity at a UE, wherein the TPC command is divided into TPC slots. Indeed, the TPC command 152 may be divided into three sets of five TPC slots within a radio frame. For example, the receiving component 142 is configured to receive a TPC command 152 from network 112 at UE 114 over wireless link 125, wherein TPC command 152 is divided into three TPC slot sets of TPC slots 0-4, slots 5-9, and slots 10-14.

It should also be noted that the received TPC command may be a voice only call, a packet switched call, a circuit switched call, or a multiple radio access bearer (MRAB) call.

The call processing component 140 may also be configured to include a decoding component 143 capable of decoding every TPC slot of the TPC command resulting in a decoded symbol for every TPC slot of the TPC command. For example, decoding component 143 is configured to decode TPC slots 0-14 of TPC command 152 received from network 112 at UE 114 over wireless link 125.

Still further, the call processing component 140 may be configured to include a determining component 144 capable of determining when a current decoded symbol of the TPC slot is in disagreement with a previous decoded symbol in the TPC slot. For example, determining component 144 is configured to determine that the current decoded symbol of TPC slot 0-14 of TPC command 152 received from network 112 at UE 114 over wireless link 125 is in disagreement with a previous decoded symbol in the TPC slot 0-14 of TPC command 152 received from network 112 at UE 114 over wireless link 125.

In another aspect, the call processing component 140 may be configured to include a ceasing component 145 capable of ceasing the decoding of the TPC slot set when the current decoded symbol in the TPC slot is in disagreement with the previous decoded symbol of the TPC slot. As discussed above, a TPC command 152 is divided into sets of TPC slots 0-4, slots 5-9, and slots 10-14. For example, ceasing component 145 is configured to cease decoding of the TPC slot set when the current decoded symbol of TPC slot of TPC slots 0-4 of TPC command 152 received from network 112 at UE 114 over wireless link 125 is in disagreement with a previous decoded symbol of the TPC slot of TPC slots 0-4 of TPC command 152. The ceasing component may also be configured to cease decoding when current decoded symbol of TPC slot of TPC slots 5-9 (or 10-14) of TPC command 152 is in disagreement with a previous decoded symbol of the TPC slot of TPC slots 5-9 (or 10-14) of TPC command 152.

Additionally, the call processing component 140 may be configured to include a deactivating component 146 capable of deactivating a receiver of the UE until the end of the TPC slot set. For example, deactivating component 146 is configured to deactivate the receiver of UE 114 until the end of the TPC slot set 0-4 when the current decoded symbol of TPC slot of TPC slots 0-4, 5-9, or 10-14 of TPC command 152 received from network 112 at UE 114 over wireless link 125 is in disagreement with a previous decoded symbol in the TPC slot of TPC slots 0-4, 5-9, or 10-14 of TPC command 152.

Optionally, the call processing component 140 may be configured to include an omitting component 147 capable of omitting the decoding of a predetermined number of TPC slots in each TPC slot set. For example, omitting component 147 may omit decoding of TPC slots 0-2 of TPC command 152 received from network 112 at UE 114 over wireless link 125 before decoding TPC slots 3-4 of TPC command 152. In other words, the decoding of first three TPC slots of every group of TPC slot sets are omitted.

As discussed above, TPC command 152 may be divided into three sets of five TPC slots within a radio frame. In previous systems, when there is a disagreement within the set of 5 TPC commands, the UE doesn't change the transmission power until after end of 5 slot group. However, aspects of the above methodology allow for changing the transmission power once there is disagreement between an UP and DOWN command within the TPC slots.

In other words, the UE continues decoding until the UE hits a disagreement in when the TPC symbols in the TPC slots are decoded. Thereafter, the UE does not decode any further and turns off the receiver until the time period of 5 slot group has passed and the next set of 5 appears. It should also be noted that the receiver reactivates in every slot set to decode TPC symbols in each TPC slot set of the TPC command.

In an aspect, if the TPC symbols in TPC command 152 that are decoded in TPC slots 0-4 are in the TPC pattern of 0 0 0 0 0, then UE 114 decodes until the $5^{th}$ slot because all the first four symbols are in agreement. Additionally, the receiver of UE 114 is not turned off.

In another aspect, if the TPC symbols in TPC command 152 that are decoded in TPC slots 0-4 are in the TPC pattern of 1 1 1 1 1, then UE 114 decodes until the $5^{th}$ slot because all the first four symbols are in agreement. Additionally, the receiver is not turned off.

In another aspect, if the TPC symbols in TPC command 152 that are decoded in TPC slots 0-4 are in the TPC pattern of 1 0 1 1 1, UE 114 does not need to decode after $2^{nd}$ slot, because there is a disagreement within first two slots. Additionally, the receiver of UE 114 is turned off, savings transmission power for last 3 slots.

In another aspect, if the TPC symbols in TPC command 152 that are decoded in TPC slots 0-4 are in the TPC pattern of 1 1 0 1 1, UE 114 does not need to decode after $3^{rd}$ slot, because there is a disagreement within first three slots. Additionally, the receiver of UE 114 is turned off, savings transmission power for last 2 slots.

In alternative optional aspect, only the last two TPC symbols in TPC command 152 are decoded in a group of TPC slots. As discussed above, decoding of TPC slots 0-2 of TPC command 152 are omitted before UE 114 decodes TPC slots 3-4 of TPC command 152. It should be noted that transmission power is not turned off, the transmission power remains the same during the whole of TPC slot set when UE 114 omits the TPC command decoding. However, transmission power may change based on the decision of the last two slots of TPC commands. For example, if there is a disagreement between the last two TPC commands received from the network, the transmission power will remain the same for the next TPC slot set. However, if both of the last two commands are UP (0, 0, 0, 1, 1), the transmission power will go up by 1 dB at the beginning of next TPC slot set. And if both of the last two TPC commands are DOWN (1, 1, 1, 0, 0), then transmission power will go down by 1 dB at the beginning of next TPC slot set.

Figure 3:
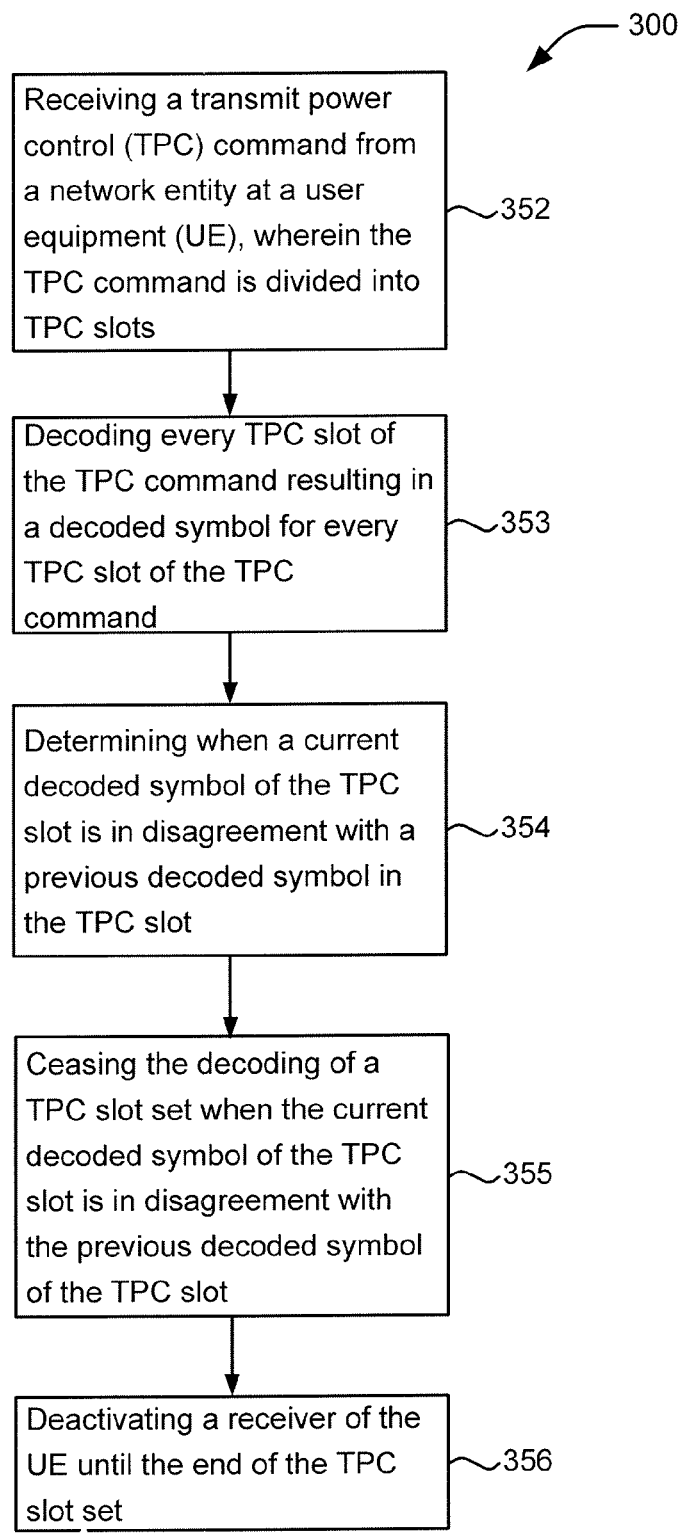
FIG. 3 is a flow diagram illustrating an exemplary method for call processing in a wireless communication system.

FIG. 3 is a flow diagram illustrating an exemplary method 300. At 352, the UE receiving a TPC command from a network entity, wherein the TPC command is divided into TPC slots. For example, as discussed above with reference to FIG. 2, the receiving component 42 is configured to receive a TPC command 152 from network 112 at UE 114 over wireless link 125, wherein the TPC command is divided into TPC slots 0-14.

At 353, decoding every TPC slot of the TPC command resulting in a decoded symbol for every TPC slot of the TPC command. For example, as discussed above with reference to FIG. 2, after receiving a TPC command from a network entity, decoding component 143 is configured to decode TPC slots 0-14 of TPC command 152 received from network 112 at UE 114 over wireless link 125.

At 354, the UE determines when a current decoded symbol of the TPC slot is in disagreement with a previous decoded symbol in the TPC slot. For example, as discussed above with reference to FIG. 2, after decoding every TPC slot of the TPC command resulting in a decoded symbol for every TPC slot of the TPC command, determining component 144 is configured to determine that a current decoded symbol of TPC slots 0-14 of TPC command 152 received from network 112 at UE 114 over wireless link 125 is in disagreement with a previous decoded symbol in the TPC slot 0-14 of TPC command 152.

At 355, the UE ceasing the decoding of the TPC slot set when the current decoded symbol of the TPC slot is in disagreement with the previous decoded symbol in the TPC slot set. For example, as discussed above with reference to FIG. 2, after determining when a current decoded symbol of the TPC slot is in disagreement with a previous decoded symbol in the TPC slot, ceasing component 145 is configured to cease decoding of the TPC slot set when the current decoded symbol of TPC slot of TPC slots 0-4, 5-9, or 10-14 of TPC command 152 received from network 112 at UE 114 over wireless link 125 is in disagreement with a previous decoded symbol of the TPC slot of TPC slots 0-4, 5-9, or 10-14 of TPC command 152.

At 356, the UE deactivates a receiver until the end of the TPC slot set. For example, as discussed above with reference to FIG. 2, after ceasing the decoding of a TPC slot set when the current decoded symbol of the TPC slot is in disagreement with the previous decoded symbol in the TPC slot set, deactivating component 146 is configured to deactivate the receiver of UE 114 until the end of the TPC slot set 0-4 when the current decoded symbol of TPC slot of TPC slots 0-4, 5-9, or 10-14 of TPC command 152 received from network 112 at UE 114 over wireless link 125 is in disagreement with a previous decoded symbol in the TPC slot of TPC slots 0-4, 5-9, or 10-14 of TPC command 152.

In an aspect, for example, the UE executing method 300 may be UE 114 (FIG. 1) executing the call processing component 140 (FIG. 1), or respective components thereof.

Thus, aspects of this apparatus and method include improving the call performance and power consumption of a UE during the connection state with a network entity.

Figure 4:
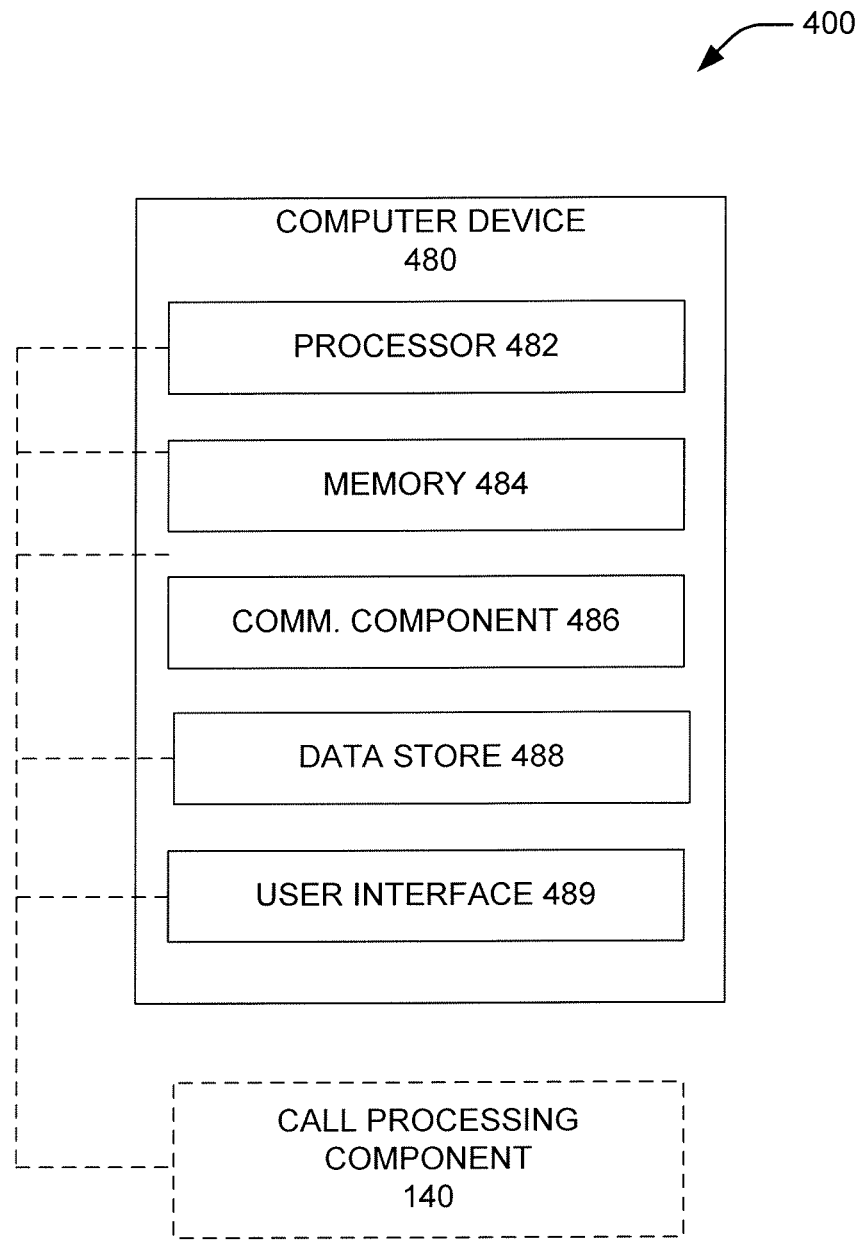
FIG. 4 is a block diagram illustrating additional example components of an aspect of a computer device having a call processing component according to the present disclosure.

Referring to the computer system 400 of FIG. 4, in one aspect, UE 114 and/or wireless serving node 116 of FIGS. 1 and 2 may be represented by a specially programmed or configured computer device 480, wherein the special programming or configuration includes call processing component 140, as described herein. For example, for implementation as UE 114 (FIGS. 1 and 2), computer device 480 may include one or more components for computing and transmitting a data from a UE 114 to network 112 via wireless serving node 116, such as in specially programmed computer readable instructions or code, firmware, hardware, or some combination thereof. Computer device 480 includes a processor 482 for carrying out processing functions associated with one or more of components and functions described herein. Processor 482 can include a single or multiple set of processors or multi-core processors. Moreover, processor 482 can be implemented as an integrated processing system and/or a distributed processing system.

Computer device 480 further includes a memory 484, such as for storing data used herein and/or local versions of applications being executed by processor 482. Memory 484 can include any type of memory usable by a computer, such as random access memory (RAM), read only memory (ROM), tapes, magnetic discs, optical discs, volatile memory, non-volatile memory, and any combination thereof.

Further, computer device 480 includes a communications component 486 that provides for establishing and maintaining communications with one or more parties utilizing hardware, software, and services as described herein. Communications component 486 may carry communications between components on computer device 480, as well as between computer device 480 and external devices, such as devices located across a communications network and/or devices serially or locally connected to computer device 480. For example, communications component 486 may include one or more buses, and may further include transmit chain components and receive chain components associated with a transmitter and receiver, respectively, or a transceiver, operable for interfacing with external devices. For example, in an aspect, a receiver of communications component 486 operates to receive one or more data via a wireless serving node 46, which may be a part of memory 484.

Additionally, computer device 480 may further include a data store 488, which can be any suitable combination of hardware and/or software, that provides for mass storage of information, databases, and programs employed in connection with aspects described herein. For example, data store 488 may be a data repository for applications not currently being executed by processor 482.

Computer device 480 may additionally include a user interface component 489 operable to receive inputs from a user of computer device 480, and further operable to generate outputs for presentation to the user. User interface component 489 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 489 may include one or more output devices, including but not limited to a display, a speaker, a haptic feedback mechanism, a printer, any other mechanism capable of presenting an output to a user, or any combination thereof.

Furthermore, computer device 480 may include, or may be in communication with, call processing component 140, which may be configured to perform the functions described herein.

Figure 5:
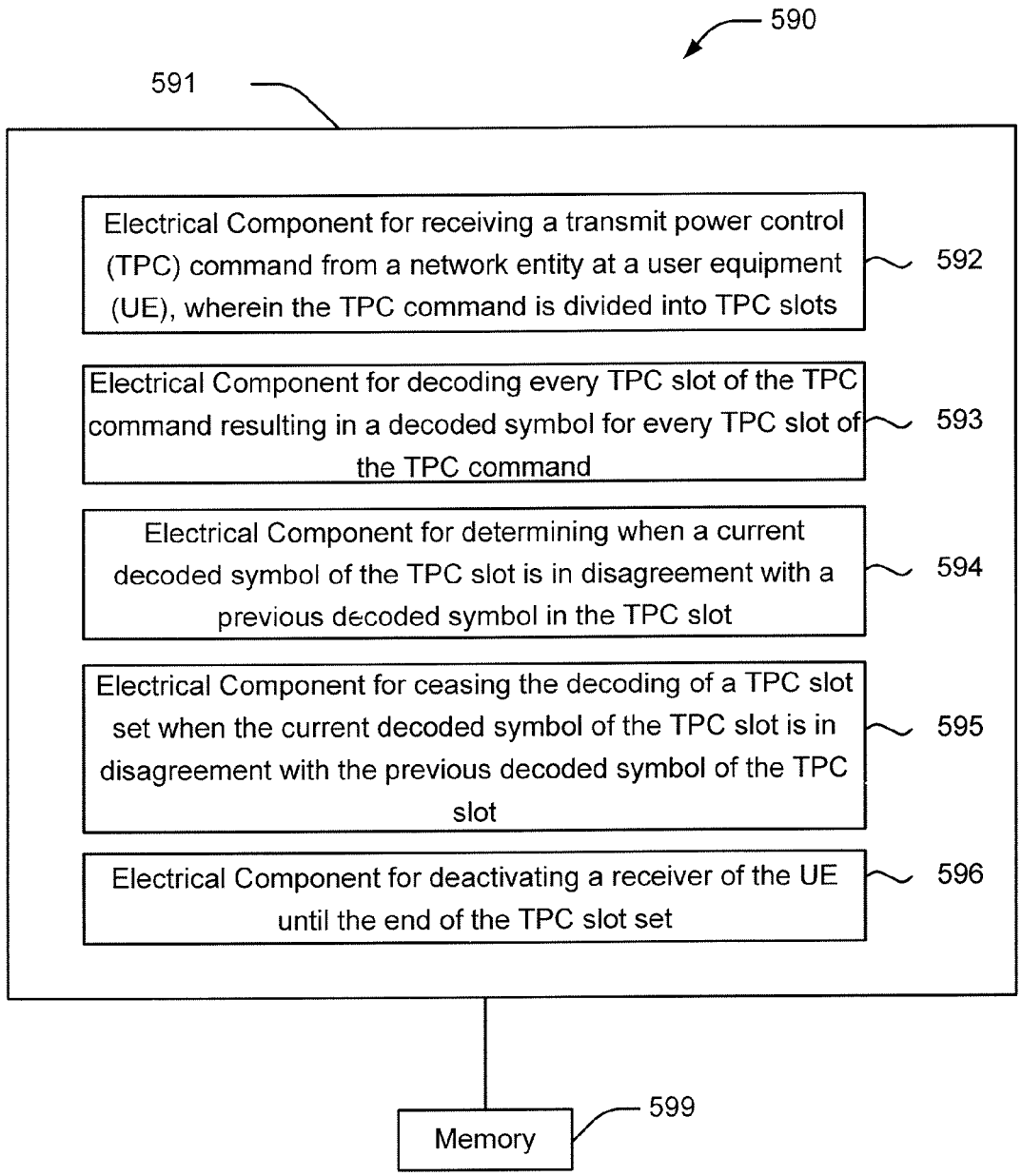
FIG. 5 is a component diagram illustrating aspects of a logical grouping of electrical components as contemplated by the present disclosure.

Referring to FIG. 5, an example system 590 is displayed for transmitting vast amount of data from a mobile device to a network. For example, system 590 can reside at least partially within UE 114 of FIGS. 1 and 2. It is to be appreciated that system 590 is represented as including functional blocks, which can be functional blocks that represent functions implemented by a processor, software, or combination thereof (e.g., firmware). For example, system 590 may be implemented via processor 482, memory 484, communications component 486, and data store 488 of FIG. 4, by for example, processor 482 executing software stored by memory 484 and/or data store 488.

Example system 590 includes a logical grouping 591 of electrical components that can act in conjunction. For instance, logical grouping 591 can include an electrical component 592 for receiving a TPC command from a network entity at a UE, wherein the TPC command is divided into TPC slots. In an aspect, electrical component 592 may include receiving component 142 (FIG. 2).

Additionally, logical grouping 591 can include an electrical component 593 for decoding every TPC slot of the TPC command resulting in a decoded symbol for every TPC slot of the TPC command. In an aspect, electrical component 593 may include decoding component 143 (FIG. 2).

Additionally, logical grouping 591 can include an electrical component 594 for determining when a current decoded symbol of the TPC slot is in disagreement with a previous decoded symbol in the TPC slot. In an aspect, electrical component 594 may include determining component 144 (FIG. 2).

Logical grouping 591 can include an electrical component 595 for ceasing the decoding of the TPC slot set when the current decoded symbol of the TPC slot is in disagreement with the previous decoded symbol of the TPC slot. In an aspect, electrical component 595 may include ceasing component 145 (FIG. 2).

Logical grouping 591 can include an electrical component 596 for deactivating a receiver (Rx) of the UE until the end of the TPC slot set. In an aspect, electrical component 596 may include deactivating component 146 (FIG. 2).

Electrical components 592-596 may correspond to one or more components in FIG. 2, and such components may be separate physical components, components implemented by processor 482 (FIG. 4), or a combination thereof.

Additionally, system 590 can include a memory 599 that retains instructions for executing functions associated with the electrical components 592-596, stores data used or obtained by the electrical components 592-596, etc. While shown as being external to memory 599, it is to be understood that one or more of the electrical components 592-596 can exist within memory 599. In one example, electrical components 592-596 can comprise at least one processor, or each electrical component 592-596 can be a corresponding module of at least one processor. Moreover, in an additional or alternative example, electrical components 592-596 can be a computer program product including a computer readable medium, where each electrical component 592-596 can be corresponding code.

Figure 6:
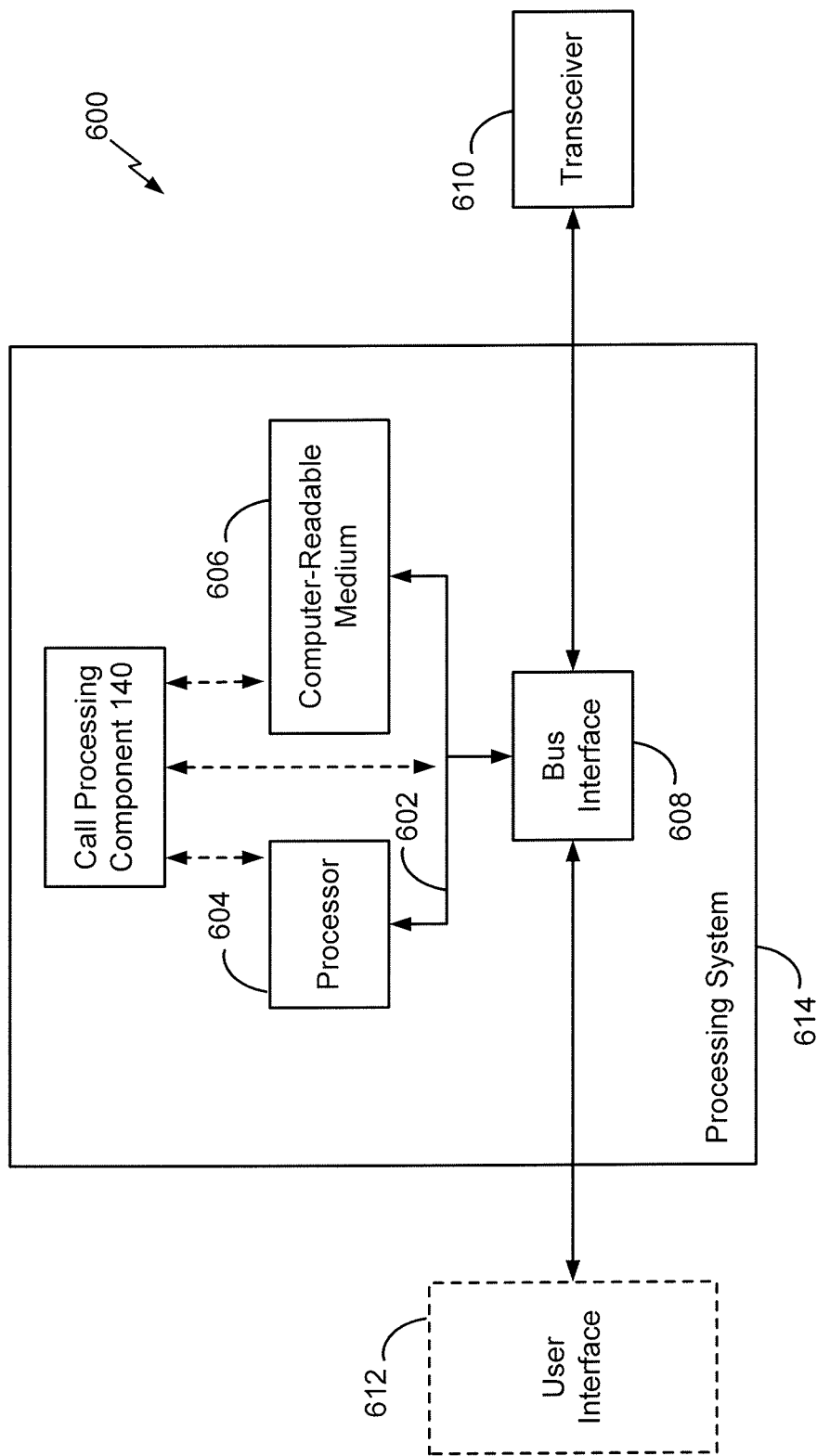
FIG. 6 is a block diagram illustrating an example of a hardware implementation for an apparatus employing a processing system to perform the functions described herein.

FIG. 6 is a block diagram illustrating an example of a hardware implementation for an apparatus 600 employing a processing system 614. Apparatus 600 may be configured to include, for example, wireless communication system 100 (FIGS. 1 and 2) and/or call processing component 140 (FIGS. 1 and 2) implementing the components described above, such as receiving component 142, decoding component 143, determining component 144, ceasing component 145, and deactivating component 146. In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, and computer-readable media, represented generally by the computer-readable medium 606. The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 66 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

In an aspect, processor 604, computer-readable medium 606, or a combination of both may be configured or otherwise specially programmed to perform the functionality of the call processing component 140 (FIGS. 1 and 2) as described herein.

The various concepts presented throughout this disclosure may be implemented across a broad variety of telecommunication systems, network architectures, and communication standards.

Figure 7:
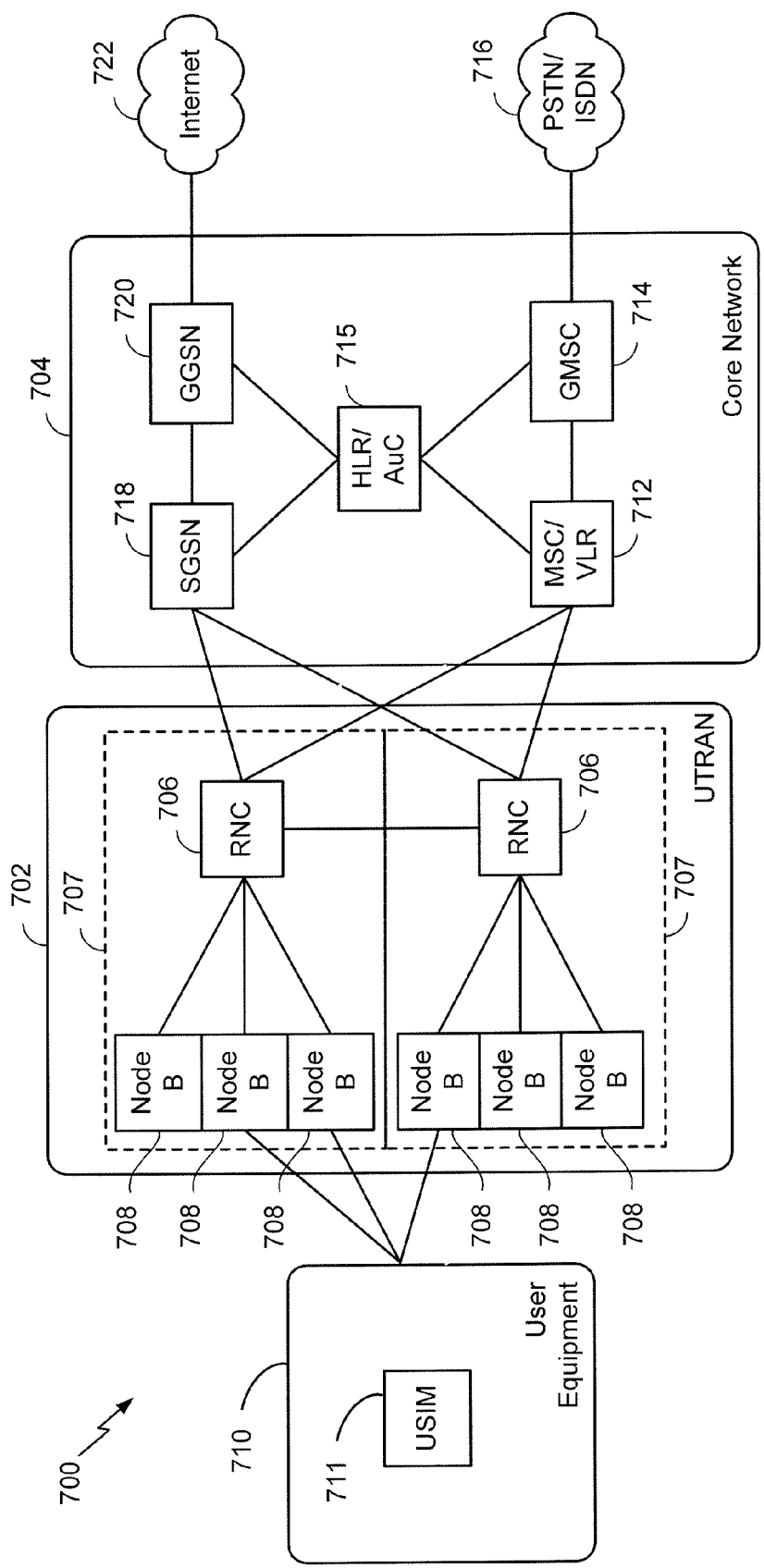
FIG. 7 is a block diagram conceptually illustrating an example of a telecommunications system including a UE configured to perform the functions described herein.

Referring to FIG. 7, by way of example and without limitation, the aspects of the present disclosure are presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710. UE 710 may be configured to include, for example, the call processing component 140 (FIGS. 1 and 2) implementing the components described above, such as receiving component 142, decoding component 143, determining component 144, ceasing component 145, and deactivating component 146. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708 may be considered as including a physical (PHY) layer and a medium access control (MAC) layer. Further, communication between a UE 710 and an RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 710 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a Node B 708 to a UE 710, and the UL, also called the reverse link, refers to the communication link from a UE 710 to a Node B 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 708 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to the node B 708 over the HS-DPCCH to indicate whether it correctly decoded a packet on the downlink.

HS-DPCCH further includes feedback signaling from the UE 710 to assist the node B 708 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 708 and/or the UE 710 may have multiple antennas supporting MIMO technology. The use of MIMO technology enables the node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate, or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables the node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
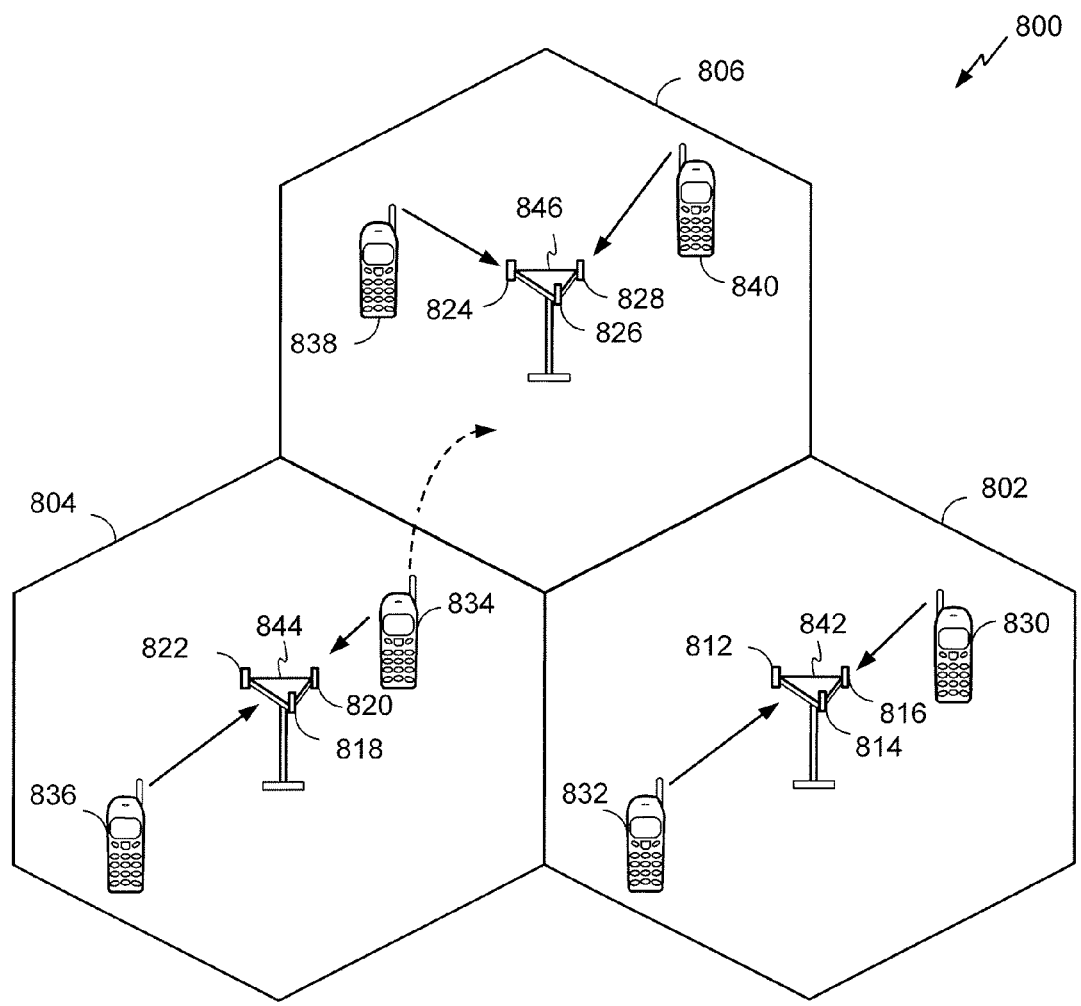
FIG. 8 is a conceptual diagram illustrating an example of an access network for use with a UE configured to perform the functions described herein.

Referring to FIG. 8, an access network 800 in a UTRAN architecture is illustrated. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 88, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with Node B 842, UEs 834 and 836 may be in communication with Node B 844, and UEs 838 and 840 can be in communication with Node B 846. Here, each Node B 842, 844, 846 is configured to provide an access point to a CN 704 (see FIG. 7) for all the UEs 830, 832, 834, 836, 838, 840 in the respective cells 802, 804, and 806. Node Bs 842, 844, 846 and UEs 830, 832, 834, 836, 838, 840 respectively may be configured to include, for example, the call processing component 140 (FIGS. 1 and 2) implementing the components described above, such as receiving component 142, decoding component 143, determining component 144, ceasing component 145, and deactivating component 146.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (see FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 9.

Figure 9:
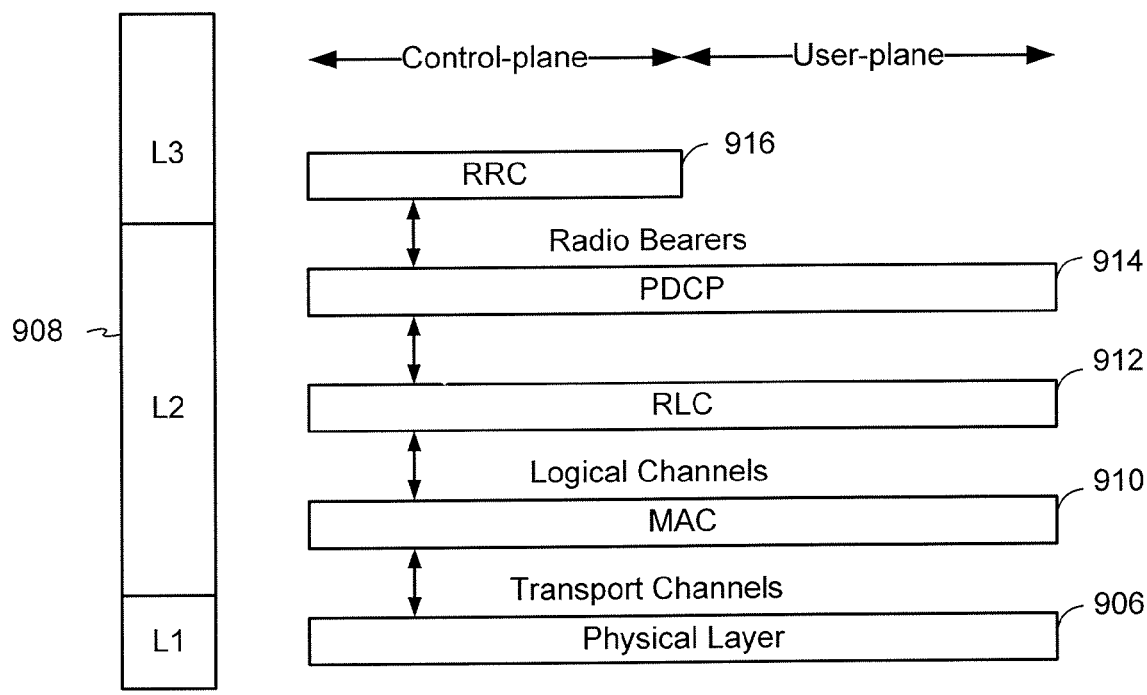
FIG. 9 is a conceptual diagram illustrating an example of a radio protocol architecture for the user and control planes for a base station and/or a UE configured to perform the functions described herein.

FIG. 9 is a conceptual diagram illustrating an example of the radio protocol architecture 900 for the user plane and the control plane of a user equipment (UE) or node B/base station. For example, architecture 900 may be included in a network entity and/or UE such as an entity within network 112 and/or UE 114 (FIGS. 1 and 2). The radio protocol architecture 900 for the UE and node B is shown with three layers 908: Layer 1, Layer 2, and Layer 3. Layer 1 is the lowest lower and implements various physical layer signal processing functions. As such, Layer 1 includes the physical layer 906. Layer 2 (L2 layer) is above the physical layer 906 and is responsible for the link between the UE and node B over the physical layer 906. Layer 3 (L3 layer) includes a radio resource control (RRC) sublayer 916. The RRC sublayer 916 handles the control plane signaling of Layer 3 between the UE and the UTRAN.

In the user plane, the L2 layer includes a media access control (MAC) sublayer 910, a radio link control (RLC) sublayer 912, and a packet data convergence protocol (PDCP) 914 sublayer, which are terminated at the node B on the network side. Although not shown, the UE may have several upper layers above the L2 layer including a network layer (e.g., IP layer) that is terminated at a PDN gateway on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between node Bs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

Figure 10:
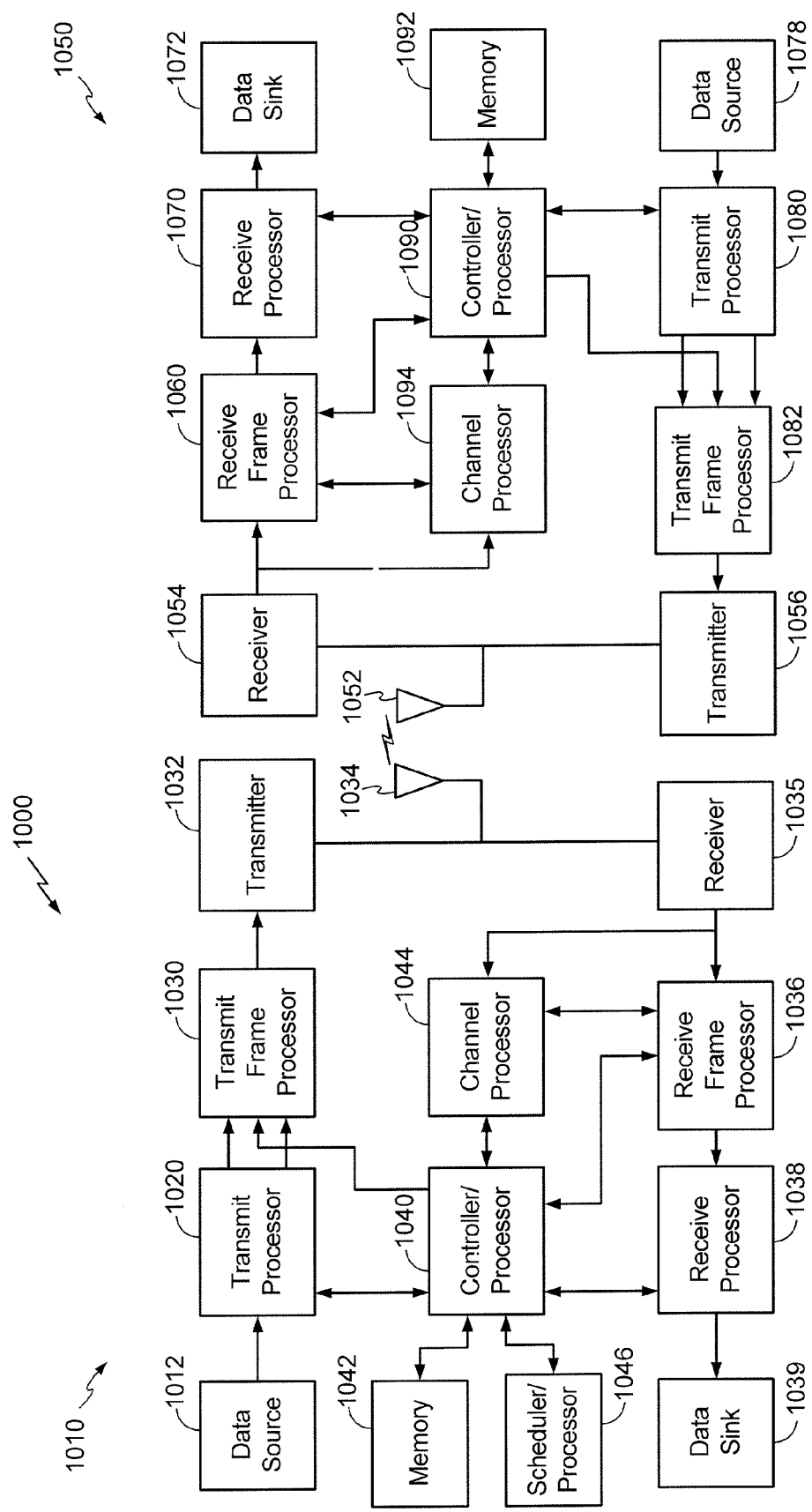
FIG. 10 is a block diagram conceptually illustrating an example of a Node B in communication with a UE in a telecommunications system configured to perform the functions described herein.

FIG. 10 is a block diagram of a communication system 1000 including a Node B 1010 in communication with a UE 1050, where Node B 1010 may be an entity within network 112 and the UE 1050 may be UE 114 according to the aspect described in FIGS. 1 and 2. In the downlink communication, a transmit processor 1020 may receive data from a data source 1016 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through the antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.10 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 4 or 6) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606 (FIG. 6). The computer-readable medium 606 (FIG. 6) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving a transmit power control (TPC) command from a network entity at a user equipment (UE), wherein the TPC command is divided into one or more TPC slot sets of TPC slots;
   decoding a TPC slot of a TPC slot set of the one or more sets of TPC slots resulting in a decoded symbol for the TPC slot of the TPC slot set;
   omitting the decoding of a number of TPC slots in each of the one or more TPC slot sets;
   determining whether the decoded symbol of the TPC slot is in disagreement with a previous decoded symbol in the TPC slot set;
   ceasing the decoding of the TPC slot set based on determining that the decoded symbol of the TPC slot is in disagreement with the previous decoded symbol of the TPC slot set; and
   deactivating a receiver of the UE until an end of the TPC slot set based on ceasing the decoding of the TPC slot set.

2. The method of claim 1, further comprising:
   reactivating the receiver of the UE after the TPC slot set to receive one or more additional TPC slot sets or TPC commands.

3. The method of claim 1, wherein the one or more TPC slot sets comprise three TPC slot sets each having five TPC slots within a radio frame.

4. The method of claim 1, wherein the received TPC command is a voice only call.

5. The method of claim 1, wherein the received TPC command is a packet switched call, or a circuit switched call.

6. The method of claim 1, wherein the received TPC command is a multiple radio access bearer (MRAB) call.

7. The method of claim 1, wherein the decoded symbol of the TPC slot is either a UP command or a DOWN command.

8. The method of claim 1, wherein the omitting the decoding of a number of TPC slots in each of the one or more TPC slot sets comprises omitting the first three TPC slots of each of the one or more TPC slot sets.

9. The method of claim 1, wherein transmission power changes based on the last two TPC slots of each of the one or more TPC slot sets.

10. An apparatus of wireless communication, comprising:
at least one processor; and
a memory coupled to the at least one processor, wherein the at least one processor is configured to:
receive a transmit power control (TPC) command from a network entity at a user equipment (UE), wherein the TPC command is divided into one or more TPC slot sets of TPC slots;
decode a TPC slot of a TPC slot set of the one or more sets of TPC slots resulting in a decoded symbol for the TPC slot of the TPC slot set;
omit the decoding of a number of TPC slots in each of the one or more TPC slot sets;
determine whether the decoded symbol of the TPC slot is in disagreement with a previous decoded symbol in the TPC slot set;
cease the decoding of the TPC slot set based on determining that the decoded symbol of the TPC slot is in disagreement with the previous decoded symbol of the TPC slot set; and
deactivate a receiver of the UE until an end of the TPC slot set based on ceasing the decoding of the TPC slot set.

11. The apparatus of claim 10, wherein the at least one processor is further configured to:
reactivate the receiver of the UE after the TPC slot set to receive one or more additional TPC slot sets or TPC commands.

12. The apparatus of claim 10, wherein the one or more TPC slot sets comprise three TPC slot sets each having five TPC slots within a radio frame.

13. The apparatus of claim 10, wherein the received TPC command is a voice only call.

14. The apparatus of claim 10, wherein the received TPC command is a packet switched call, or a circuit switched call.

15. The apparatus of claim 10, wherein the received TPC command is a multiple radio access bearer (MRAB) call.

16. The apparatus of claim 10, wherein the decoded symbol of the TPC slot is either a UP command or a DOWN command.

17. The apparatus of claim 10, wherein the at least one processor configured to omit the decoding of a number of TPC slots in each of the one or more TPC slot sets is further configured to omit the first three TPC slots of each of the one or more TPC slot sets.

18. The apparatus of claim 10, wherein transmission power changes based on the last two TPC slots of each of the one or more TPC slot sets.

19. An apparatus of wireless communication, comprising:
means for receiving a transmit power control (TPC) command from a network entity at a user equipment (UE), wherein the TPC command is divided into one or more TPC slot sets of TPC slots;
means for decoding a TPC slot of a TPC slot set of the one or more sets of TPC slots resulting in a decoded symbol for the TPC slot of the TPC slot set;
means for omitting the decoding of a number of TPC slots in each of the one or more TPC slot sets;
means for determining whether the decoded symbol of the TPC slot is in disagreement with a previous decoded symbol in the TPC slot set;
means for ceasing the decoding of the TPC slot set based on determining that the decoded symbol of the TPC slot is in disagreement with the previous decoded symbol of the TPC slot set; and
means for deactivating a receiver of the UE until an end of the TPC slot set based on ceasing the decoding of the TPC slot set.

20. A non-transitory computer readable medium, comprising code for:
receiving a transmit power control (TPC) command from a network entity at a user equipment (UE), wherein the TPC command is divided into one or more TPC slot sets of TPC slots;
decoding a TPC slot of a TPC slot set of the one or more sets of TPC slots resulting in a decoded symbol for the TPC slot of the TPC slot set;
omitting the decoding of a number of TPC slots in each of the one or more TPC slot sets;
determining whether the decoded symbol of the TPC slot is in disagreement with a previous decoded symbol in the TPC slot set;
ceasing the decoding of the TPC slot set based on determining that the decoded symbol of the TPC slot is in disagreement with the previous decoded symbol in of TPC slot set; and
deactivating a receiver of the UE until an end of the TPC slot set based on ceasing the decoding of the TPC slot set.

* * * * *